United States Patent Office 3,080,353
Patented Mar. 5, 1963

3,080,353
METHOD FOR PURIFYING OLEFIN POLYMERS
Alberto Bonvicini, Terny, Italy, assignor to Montecatini Società Generale per l'Industria Mineraria e Chimica, Milan, Italy, a corporation of Italy
No Drawing. Filed May 8, 1961, Ser. No. 108,266
Claims priority, application Italy May 12, 1960
10 Claims. (Cl. 260—93.7)

The present invention relates to a method of purifying the polymers obtained by stereospecific polymerization of olefins.

Processes for polymerizing olefins with catalysts comprising at least one organometallic compound of a metal belonging to the first, second or third group of the periodic table according to Mendelyeev and of a solid crystalline halide of a transition metal belonging to the 4th, 5th, or 6th group of the same table, with or without activators, such as pyridines, phosphines, arsines, bismuthines and/or ethers, are known.

These processes substantially comprise the introduction into the polymerization reactor of the olefin monomer, a solvent for the olefin (which acts also as a suspending agent for the polymer and is inert with respect to the catalysts) and a catalytic system which preferably comprises an alkyl aluminum compound and titanium trichloride.

The polymerization is carried out for a given time (10 to 100 hours) at temperatures such as from 30° to 90° C., under a pressure of 1 to 15 atmospheres.

It is known that in order to purify the polymer, the slurry obtained at the end of the polymerization is often subjected to various treatments.

These treatments comprise the treating of the polymer slurry with alcohols, organic acids, mineral acids or alkalis.

Complexing substances have also been proposed as clarification agents of the slurry.

We have now surprisingly found that organic compounds containing in their molecule the group

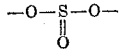

can be used as such clarification agents.

An object of the present invention is the providing of a method for purifying polymers obtained by polymerization of olefins, which polymers are prepared in the presence of catalysts which promote stereospecific polymerization.

Other objects and advantages of the present invention are apparent from the following disclosure and examples.

This method comprises a treatment of the polymerization slurry at the end of the polymerization, such as by contacting said slurries with organic compounds containing in the molecule the

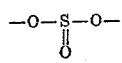

group.

These organic compounds can be added to the slurry at the end of the polymerization, either alone or dissolved (or dispersed) in inert solvents.

Among the inert solvents which may be used are preferably benzene, toluene, cyclohexane, n-pentane, n-heptane, etc.

After clarification of the polymerization slurry with said organic compounds, the polymer is preferably subjected to a treatment with water or steam to remove both the hydrocarbon solvent and the clarification agent, which treatment either dissolves the organic sulphites or removes them by mechanical entrainment.

As polymeric olefins which are especially suitable for treatment according to the present invention may be mentioned the homopolymers and copolymers of olefins of the formula $CH_2=CHR$, wherein R is hydrogen or an aliphatic or aromatic group, and exemplified by olefins such as ethylene, propylene, butene-1, 3-methyl-1-butene, pentene-1, hexene-1, 5-methyl-1-hexene, heptane-1, etc. and styrene.

Stereospecific polymers of propylene, especially crystalline, isotactic polypropylene, are purified with good results according to the present invention.

Among the organic compounds containing the

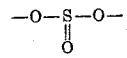

group, which may be added to the polymerization slurry, according to the present invention, those compounds having the formulas

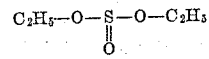

and

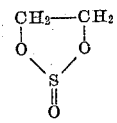

are found to be particularly suitable.

Other organic sulphites such as dimethylsulfite, isopropylsulfite, n-butylsulfite and cyclohexylsulfite also give excellent results.

The polymers purified, according to the present invention, possess a very low ash content (lower than 0.1%) and are, therefore, particularly suitable for the production of fibers and films which, as known, are produced from highly pure polymers.

The amount of organic sulfites added to the polymerization slurry, according to the present invention, can vary within wide limits.

These organic compounds are preferably added in amounts between 10% and 1000% with respect to the total weight of the catalyst.

The following examples are given to illustrate the present invention without limiting its scope.

Example I 80 liters of n-heptane, 179 g. of $Al(C_2H_5)_3$ in a 10% heptane solution and 121 g. of $TiCl_3$ are introduced into a 200-liter stainless steel autoclave.

The mixture is heated to 75° C. and a propylene feed is then started and continued until 125 liters of liquid monomer are absorbed. The polymerization proceeds for 12 hours at 75° C. The unreacted monomer is removed and recovered.

The polymerization slurry is placed in a 400-liter enamelled reactor and is contacted, according to the present invention, with 1.5 kg. of ethyleneglycol sulphite and 25 liters of n-heptane.

The slurry is agitated at 90° C. for 3 hours and is then centrifuged to remove the solvent. The cake thus obtained is then treated with steam. The polymer, after centrifugation and drying, possesses an ash content of 0.07%.

Example II

The polymerizaton slurry, obtained according to the process described in the preceding example, is transferred in a 400-liter enamelled reactor where it is contacted, according to the present invention, with 1.5 kg. of diethylsulfite and 25 liters of n-heptane.

The slurry is maintained in agitation at 90° C. for 3 hours and is then centrifuged in order to remove the solvent. The cake thus obtained is treated with steam.

The polymer, after centrifugation and drying, possesses an ash content of 0.068%.

Many changes and variatons may be made in the details of practicing the present invention without departing from the spirit and scope thereof. It is not intended to limit the scope of the present invention except as defined in the following claims.

What is claimed is:

1. A method for purifying alpha-olefin polymers obtained by the polymerization of alpha-olefins in the presence of a catalyst comprising an organometallic compound of metal selected from the class consisting of the 1st, 2nd and 3rd groups of the periodic table according to Mendelyeev and a solid crystalline halide of a transition metal selected from the class consisting of the 4th, 5th and 6th groups of said table, characterized in that the polymerization slurry is treated at the end of the polymerization with an organic compound containing the

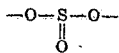

group.

2. A method according to claim 1, characterized in that the polymerization slurry is treated with ethylene glycol sulfite.

3. A method according to claim 1, characterized in that the polymerization slurry is treated with diethyl sulfite.

4. A method according to claim 1, characterized in that said organic sulfite compound is dissolved in an inert solvent.

5. A method according to claim 1, characterized in that said organic sulfite compound is dispersed in an inert solvent.

6. A method according to claim 4, characterized in that said solvetn is n-heptane.

7. A method according to claim 5, characterized in that said solvent is n-heptane.

8. A method according to claim 1, characterized in that said organic sulfite compound is used in an amount varying from 10% to 1000% based on the total weight of the catalyst.

9. A method according to claim 1, wherein the polymer is polypropylene comprising isotactic macromolecules.

10. A method according to claim 1, characterized in that after treating the polymerization slurry with said organic compound, the polymer is subjected to a treatment with a member selected from the group consisting of water and steam.

References Cited in the file of this patent

UNITED STATES PATENTS 2,955,105 Fuchs _____ Oct. 4, 1960

FOREIGN PATENTS 832,996 Great Britain _____ Apr. 21, 1960